No. 861,510. PATENTED JULY 30, 1907.
C. E. GERVAIS.
CIGAR LIGHTER.
APPLICATION FILED MAY 31, 1904.
2 SHEETS—SHEET 2.
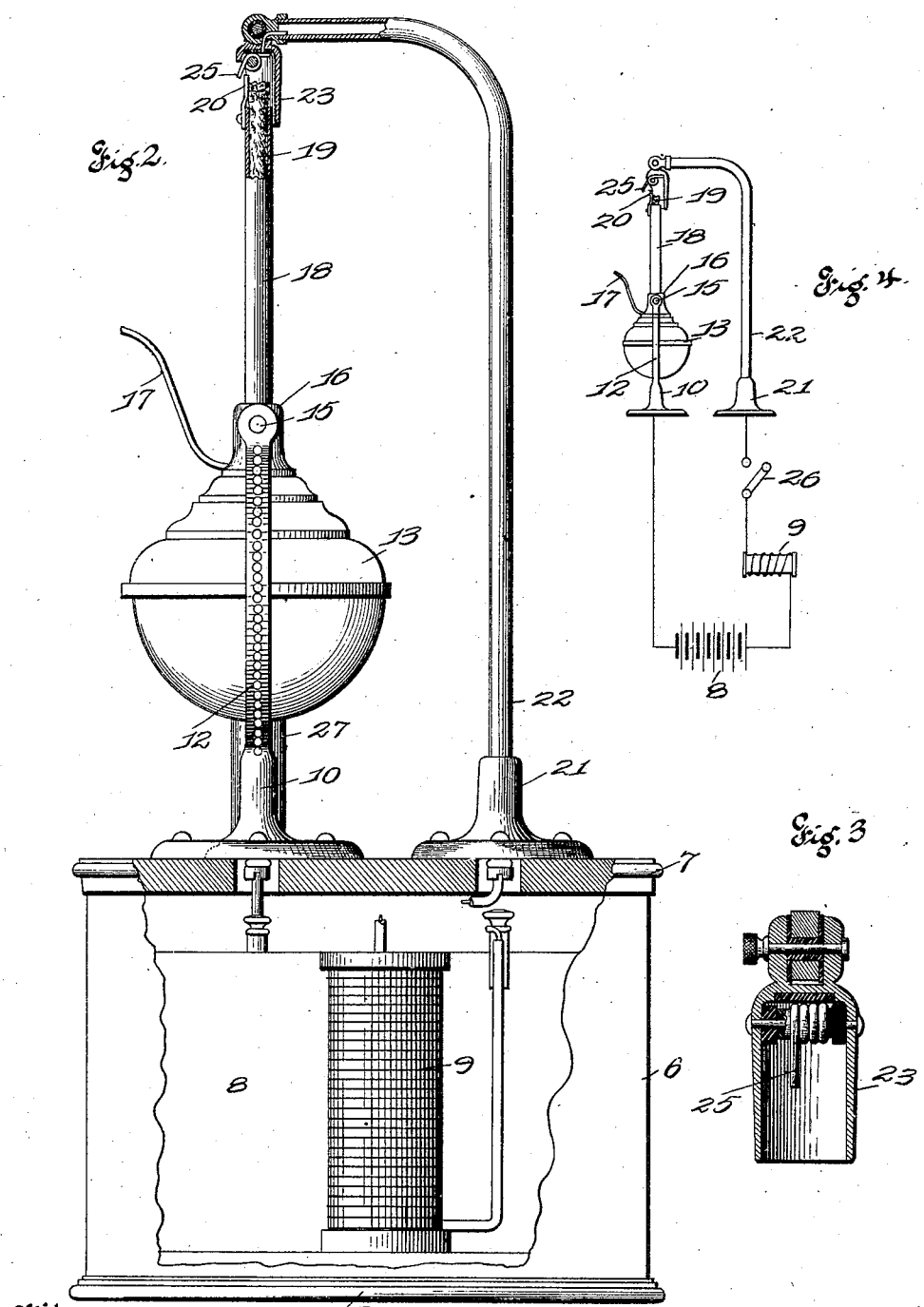

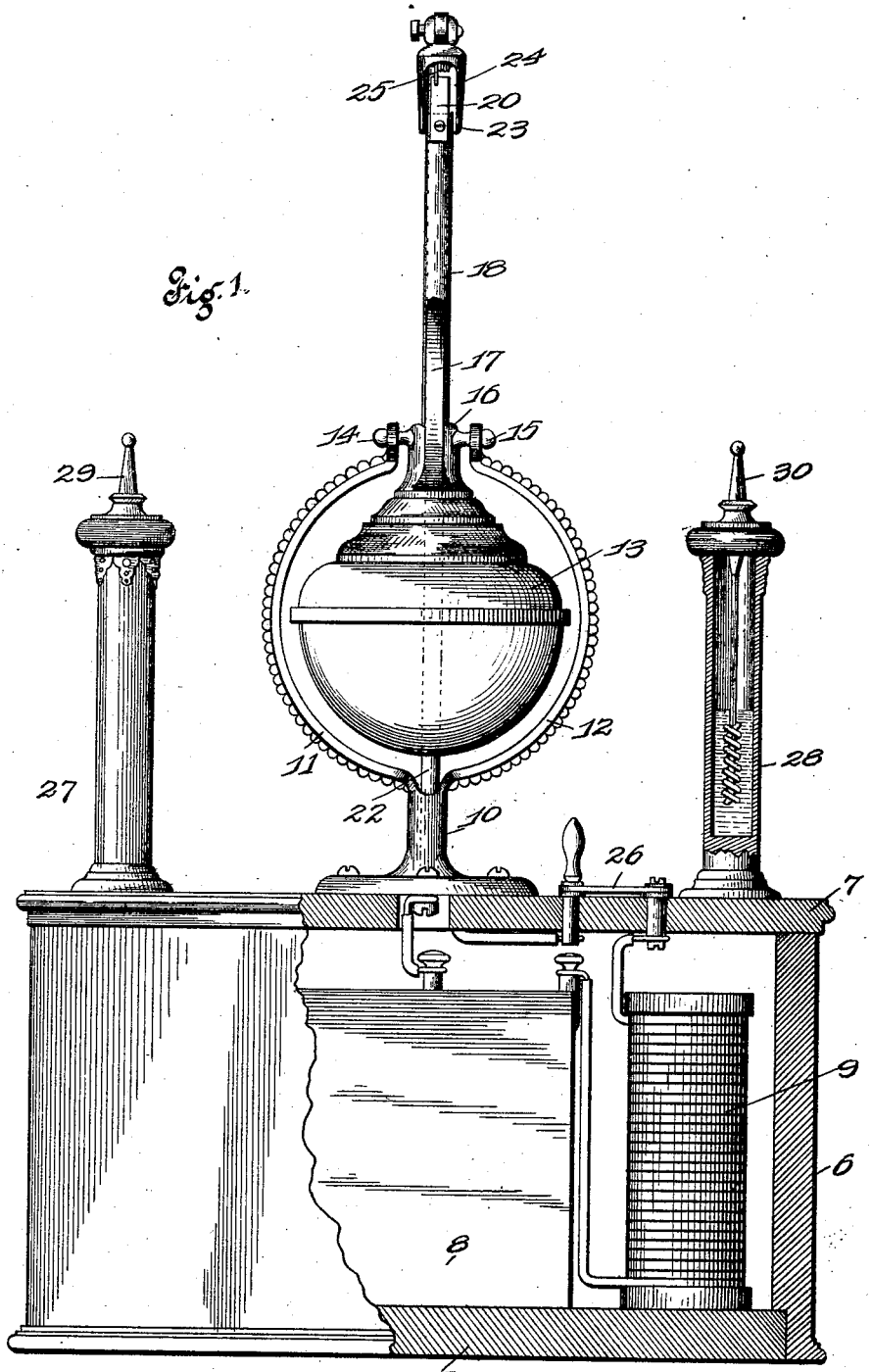

UNITED STATES PATENT OFFICE.

CHARLES E. GERVAIS, OF NEW YORK, N. Y.

CIGAR-LIGHTER.

No. 861,510.　　　Specification of Letters Patent.　　　Patented July 30, 1907.

Application filed May 31, 1904. Serial No. 210,362.

*To all whom it may concern:*

Be it known that I, CHARLES E. GERVAIS, a citizen of the United States, residing at the city of New York, State of New York, have invented certain new and useful Improvements in Cigar-Lighters, of which the following is a specification containing a full, clear, and exact description, reference being had to the accompanying drawings, forming a part hereof.

My invention relates to improvements in cigar lighters; and consists of the novel features herein shown, described and claimed.

In the drawings—Figure 1 is a front elevation partly in section of a cigar lighter embodying the principles of my invention. Fig. 2 is a side elevation partly in section of the cigar lighter shown in Fig. 1. Fig. 3 is a sectional detail upon an enlarged scale of one member of the sparker. Fig. 4 is a diagrammatic view showing the electric circuit.

Referring to the drawings in detail, the base comprises the circular bottom 5; the circular wall 6 extending upwardly from the bottom; and the circular top 7 extending upwardly from the wall 6. The battery 8 is mounted in the chamber upon the bottom 5, and the spark-coil 9 is mounted in the chamber beside the battery. A pedestal 10 is mounted upon the center of the top 7; and the tank-supporting-arms 11 and 12 extend upwardly from the pedestal. A tank 13 is mounted between the arms 11 and 12 and pivots 14 and 15 extend outwardly from the neck 16 of the tank through bearings in the upper ends of the arms 11 and 12. A handle 17 extends forwardly and upwardly from the tank; and a wick-tube 18 extends upwardly from the tank, there being a wick 19 in said wick-tube. The lower spark-member 20 is attached to the upper end of the wick-tube 18 beside the upper end of the wick. A second pedestal 21 is mounted upon the top 7; and an arm 22 extends upwardly behind the tank 13, and forwardly to a position in vertical alinement with the wick-tube 18. A light extinguishing-hood 23 extends downwardly from the upper end of the arm 22 around the upper end of the wick-tube 18; said hood having a slot 24 in its front side to receive the upper end of the wick-tube; and the upper spark-member 25 is mounted in the hood 23 in position to engage the spark-member 20; said upper spark-member being in the form of a spring; said spring being insulated from the hood and electrically connected to the arm 22.

One pole of the battery 8 is connected to the pedestal 10, and the other pole of the battery is connected to the spark-coil 9, and the spark-coil 9 is connected to one end of the switch 26, the other end of the switch being connected to the pedestal 21. When the switch is closed and the spark-members 20 and 25 are in contact, an electric circuit is established. Gasolene or alcohol is placed in the tank 13 to supply the wick 19, and when it is desired to secure light for a cigar, the handle 17 is operated to swing the upper end of the wick-tube 18 forwardly, thus causing the spark-member 20 to pass the spark-member 25, thereby creating a spark, and igniting the wick. Then the cigar may be lighted from the wick. When the handle 17 is released, the weight of the tank 13 will return the wick-tube 18 to its normal position and as the wick-tube passes into the hood 23, the flame will be extinguished.

Torch-stands 27 and 28 are mounted upon the top 7, and torches 29 and 30 are inserted into the torch-stands, and one of said torches may be used to take fire from the wick to the cigar, if desired, or the torches may be omitted.

I claim:

A cigar lighter, comprising a fixed standard, a tank pivotally mounted therein, a wick-tube extending upwardly from the tank, a sparking-finger carried by the upper end of the wick-tube, a second standard having its upper end terminating above the upper end of the wick-tube, an open front hood secured to and insulated from the end of the second standard, in which hood the upper end of the wick-tube is normally positioned, a set screw for adjustably connecting the hood to the second standard, a pin passing transversely through the upper end of the hood; a cylindrical block of insulation mounted on said pin, a coil spring positioned on said cylindrical block, one end of which spring extends downwardly into the path of travel of the sparking-finger, a battery, and suitable electrical connections from said battery to the coil spring and the sparking-finger; substantially as specified.

In testimony whereof, I have signed my name to this specification, in presence of two subscribing witnesses.

CHARLES E. GERVAIS.

Witnesses:
　ALFRED A. EICKS,
　M. M. BRAZILL.